United States Patent [19]

Marsh

[11] Patent Number: 4,973,158

[45] Date of Patent: Nov. 27, 1990

[54] ROTATING LASER BEAM REFERENCE PLANE INSTRUMENT

[76] Inventor: Richard Marsh, 1563 Meander Dr., Simi Valley, Calif. 93065

[21] Appl. No.: 338,478

[22] Filed: Apr. 14, 1989

Related U.S. Application Data

[63] Continuation of Ser. No. 116,769, Nov. 4, 1987, abandoned.

[51] Int. Cl.[5] .......... G01C 5/00

[52] U.S. Cl. .......... 356/247; 33/291

[58] Field of Search .......... 356/120, 138, 247, 400; 33/29 D, 291, DIG. 21

[56] References Cited

U.S. PATENT DOCUMENTS

| | | | |
|---|---|---|---|
| 3,462,845 | 8/1969 | Matthews | 33/291 |
| 3,471,234 | 10/1969 | Studebaker | 33/DIG. 21 |
| 3,579,846 | 5/1971 | Catherin | 356/350 |
| 3,822,943 | 7/1974 | Mason | 356/247 |

FOREIGN PATENT DOCUMENTS

| | | | |
|---|---|---|---|
| 2001414 | 7/1971 | Fed. Rep. of Germany | 356/120 |

*Primary Examiner*—Vincent P. McGraw
*Assistant Examiner*—S. A. Turner
*Attorney, Agent, or Firm*—Jessup, Beecher & Slehofer

[57] ABSTRACT

A collimator solid state laser light source is spun at a very high speed to generate a reference plane for use in the construction industry. The drive housing and the laser light source are extremely compact, light and portable, and can be mounted to a surveyor's transit and telescope. Within the housing is a drive shaft which has the laser light source attached at precisely 90 degrees to the spin axis of the drive shaft. A logic circuit is also attached to the drive shaft so that the logic circuit board, the drive shaft, and the laser light source are all rotated as a unit. An electric motor and a motor control board card are positioned within the housing for rotating the drive shaft. The operator first calibrates the transit so that it is horizontal and positioned in plumb above the reference point. The rotating laser source provides a reference plane so that the construction crew can monitor their progress to insure that the walls and floors are aligned correctly by means of having a laser beam detector to sense the laser plane generated by the laser unit.

5 Claims, 4 Drawing Sheets

22 54 56 120 52 90 84 94 92 100 140 130 34 63 30 78 78 104 32 50 80 83 90 82 81 26 102 48 9 8 46

ROTATING LASER BEAM REFERENCE PLANE INSTRUMENT

CROSS REFERENCE TO RELATED APPLICATION

This application is a continuation of application Ser. No. 07/116,769, filed Nov. 4,1987, and now abandoned.

BACKGROUND OF THE INVENTION

1. Field of the Invention:

The present invention pertains to optic measuring and testing equipment and in particular to a rotating beam of monochromatic light, i.e., laser beams, and which are detected by a photocell.

2. Description of the Prior Art:

This invention relates to a laser beam reference plane instrument of the kind used in the surveying and construction industries. This unique design allows it to be added to conventional optical instruments used in these industries and functions to provide a laser light plane to be used as an accurate positional reference when detected by portable electronic detectors.

The laser beam reference instrument of the present invention is constructed to be used as a replacement for optical means of establishing a positional reference now used in the surveying and construction industries.

Laser beam reference instruments are instruments which sweep a laser beam in a plane and are used in surveying and construction industries. The tube type gas lasers were often used as the light source and the output was deflected by sets of reflecting surfaces and lenses which sweep or swing to produce a plane of light. U.S. Pat. No. 4,062,634 to Rondo et al, gives a detailed description of a prior art laser device which uses a gas tube as a laser light source. U.S. Pat. No. 4,221,483 to Rondo gives a detailed description of a prior art solid state laser establishing a reference plane as applied to a class of instruments designed to be level instruments. Both of these prior art patents are related to a horizontal reference plane and as a self contained unit. The present invention can be used either as a horizontal or vertical reference plane.

The present invention uses a solid state laser source which allows for a much smaller, lighter weight instrument for more portability. The prior art solid state laser instruments maintain the use of many of the optical path techniques used with the gas tube laser instruments (i.e., an assembly of rotating reflective surfaces associated with a system of lenses to produce a reference plane for a non-rotating laser light source). Even with the reduction of size and weight of the prior art solid state laser beam instruments, they are still much too large to incorporate into conventional optical surveying instruments such as a transit level used in the surveying and construction industries without changing or complicating their function beyond the state of the art of their conventional or accepted common usage. The present invention so reduces the size and weight of the laser reference plane generating instrument that it can be mounted on an instrument such as a transit level and will supply a vertical reference plane of laser light in line with the optics without interfering with its original operation.

Whenever a building is to be constructed on a given plot of land, surveying instruments such as an optical level or a transit level are used to sight the corner points for the foundation of the structure to be erected on the given plot of land. An optical level which is sometimes called a dumpy level or a builder's level is placed upon a tripod and the optical level is fixed in a horizontal position. It can be used only for measuring horizontal angles because it cannot be tilted up and down. The telescope of the transit level can be moved up and down as well as sideways. Because of its vertical movement, the transit level can be used to determine if a wall is plumb, measure vertical angles, or run straight lines. The present invention is attached to either a transit level or an optical level by means of a bracket with the invention in a fixed position above the sighting telescope. The transit or optical level is set up over a reference point which can be the corner of a building or another predetermined reference point. The point over which the level is directly centered is called the station mark. This is the point from which the layout is to be sighted or shot. The tripod is centered over the station mark and the transit level or optical level is adjusted so that it is totally horizontal. Once the centering of the tripod is established, and the reference point is established, then the transit level can be used to see if a wall to be constructed is plumb, that is that it is in the true vertical position. Quite often in industrial parks the walls forming the sidewalls of a given building are made of cast concrete and are poured at the construction site. After the concrete has set for a sufficient period of time, the slabs forming the walls are raised and set into position. The plumb of the concrete slab forming part of the sidewall must be checked to make sure that it is in the true vertical, that is that the wall is plumb. In the known prior art, this can be done by a transit level which allows the telescope of the transit level to be moved up and down as well as sideways. The present invention is energized by means of a battery pack and the collimator laser source emitting an infrared beam is spun at such a high speed that it creates a vertical plane. This vertical plane of laser light is used as a reference to check the plumb of the slab forming the sidewalls. Electronic detection devices are used by the construction crew to determine that the wall slab is indeed plumb by means of checking it with reference to the laser plane.

SUMMARY AND OPERATION OF THE INVENTION

A collimator solid state laser light source is spun at a very high speed to generate a reference plane for use in the construction industry. The drive housing and the laser light source are extremely compact, light and portable, and can be mounted to a surveyor's transit and tripod. Within the housing is a drive shaft which has the laser light source attached at precisely 90 degrees to the spin axis of the drive shaft. A logic circuit is also attached to the drive shaft so that the logic circuit board, the drive shaft, and the laser light source are all rotated as a unit. An electric motor and a motor control board card are positioned within the housing for rotating the drive shaft. The operator first calibrates the transit so that it is horizontal and positioned in plumb above the reference point. The rotating laser source provides a reference plane so that the construction crew can monitor their progress to insure that the walls and floors are aligned correctly by means of having a laser beam detector to sense the laser plane generated by the laser unit.

It is the primary objective of the present invention to construct a very small, light weight, portable, self contained laser beam reference plane generating instrument which can be incorporated into conventional optical instruments used in the surveying and construction industries enhancing their operation by the addition of laser reference plane generation without interfering with their original function while adding additional capability.

An important object is to construct a laser reference plane generating instrument of such small size and light weight that it may be mounted on an optical transit or other conventional optical instrument without interfering with its convenience of transportation or normal setup and use.

The laser beam instrument of the present invention eliminates the system necessary to reflect the collimated laser light source precisely 90 degrees and rotating that optical assembly to generate a plane of light from a stationary laser light source. The present invention achieves a very light and compact construction by using a special unitized solid state laser light source collimating lenses and all the necessary electronics mounted in such a way that the entire assembly may be rotated or spun to establish the laser light reference plane. This is achieved without changing the direction of travel of the light from its original source to its final output.

An infrared laser source and collimating lenses are mounted in a cylindrical unit. This unit is mounted on a shaft precisely 90 degrees from the spin axis of the rotating shaft. An electronic circuit card which drives and controls the light source is also mounted on this shaft.

An electric motor is used to spin the shaft on its axis to generate the plane of laser light. Brushes and slip rings touching the shaft are used to transfer the power to the electronic card which drives the laser light source.

The spinning of the assembly is monitored by an optical sensor and is used to control the speed of the spinning and also to disable the laser output if the spinning stops, to insure operator safety.

BRIEF DESCRIPTION OF THE DRAWINGS

FIG. 6 HAS BEEN ROTATED 180 DEGREES RELATIVE TO FIG. 3.

DETAILED DESCRIPTION OF THE PREFERRED EMBODIMENT

Figure 1:
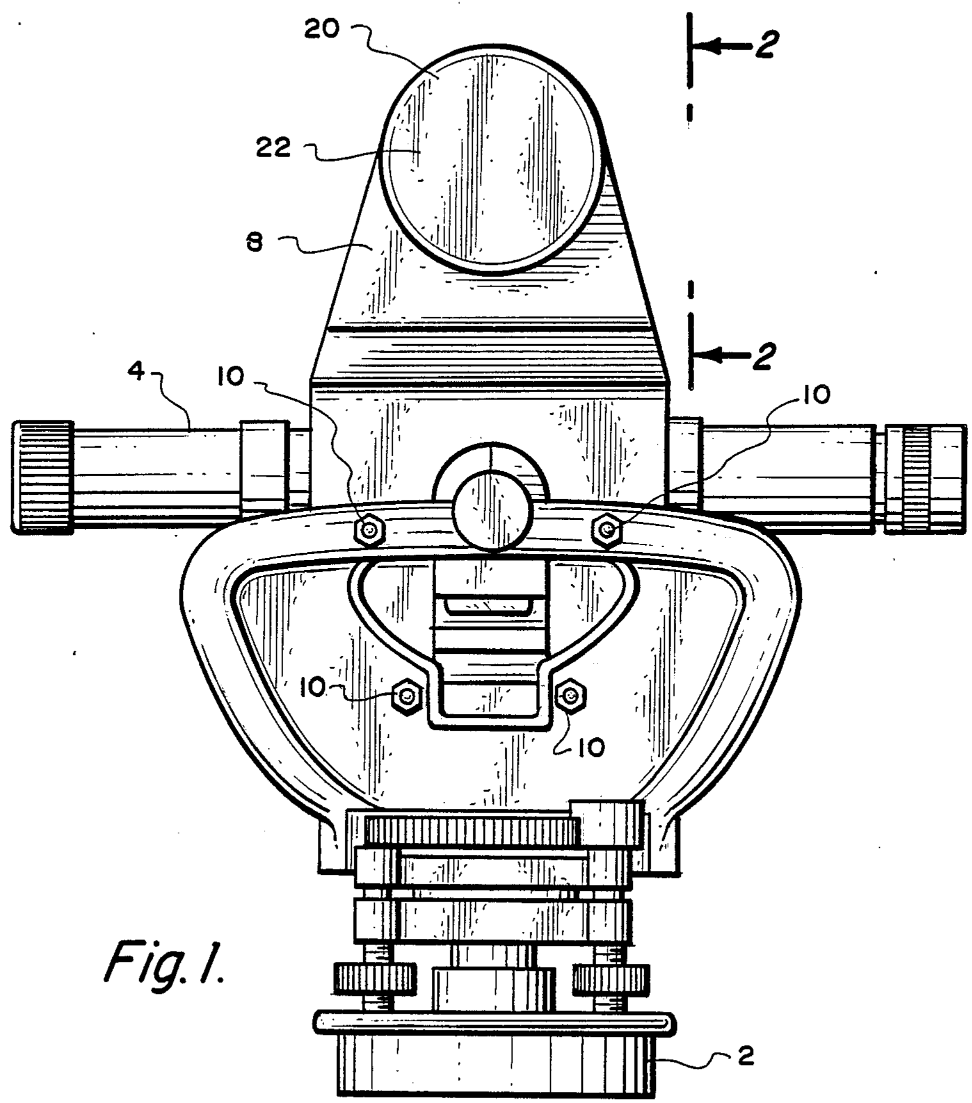
FIG. 1 illustrates a front elevational view of the ROTATING LASER BEAM REFERENCE PLANE INSTRUMENT attached by a support bracket to a telescope and turntable.

Referring now to FIG. 1, there is disclosed a turntable 2 which is mounted on a surveyor's tripod (not shown). The turntable 2 holds a sighting telescope 4 and the rotating laser beam reference plane instrument which comprises the invention and is generally labeled as 20. There is a mounting bracket 8 which mounts the invention 20 to the turntable 2 and the sighting telescope 4. Several bolts 10 secure the bracket to the mounting instrument.

Figure 2:
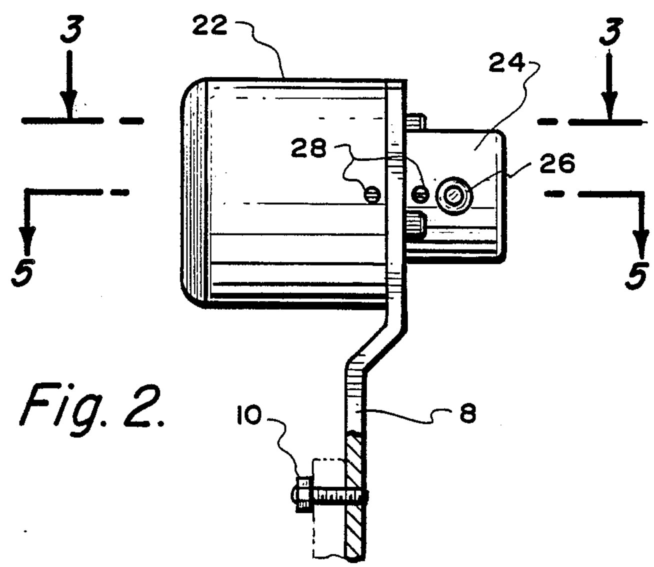
FIG. 2 shows the side elevational view of the ROTATING LASER BEAM REFERENCE PLANE INSTRUMENT and bracket taken along lines 2—2 of FIG. 1.

FIG. 2 illustrates the invention 20. The mounting bracket 8 is shown with one of the mounting bolts 10. The invention includes a motor and electric component housing 22 and a laser assembly cover 24. In FIG. 2, the eye of the laser beam is labeled as 26. Also shown in FIG. 2 are two retaining screws 28 which keep the motor housing 22 and the laser assembly cover 24 in place.

Figure 3:
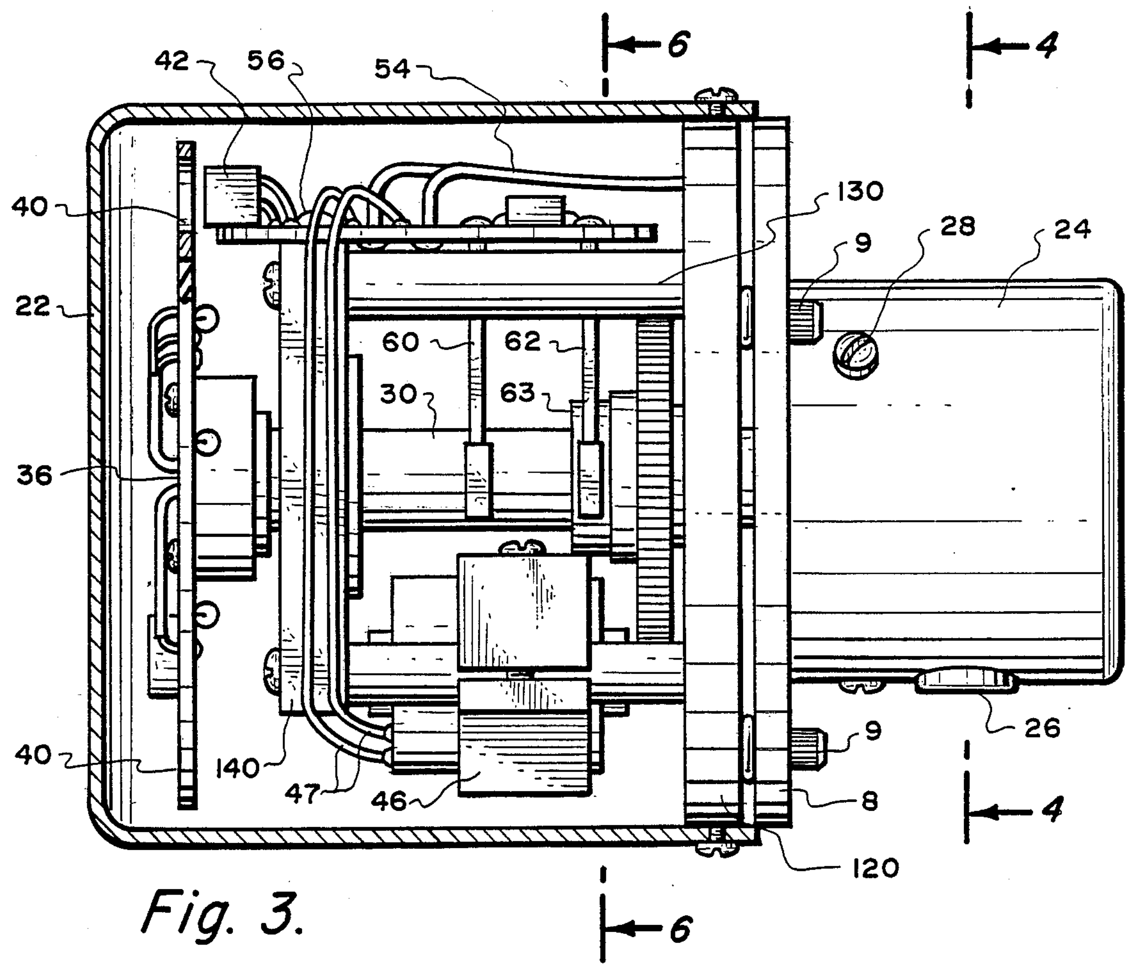
FIG. 3 is a partial cross sectional view illustrating the interior of the motorized compartment of the ROTATING LASER BEAM REFERENCE PLANE INSTRUMENT taken along the lines 3—3 of FIG. 2.
Figure 5:
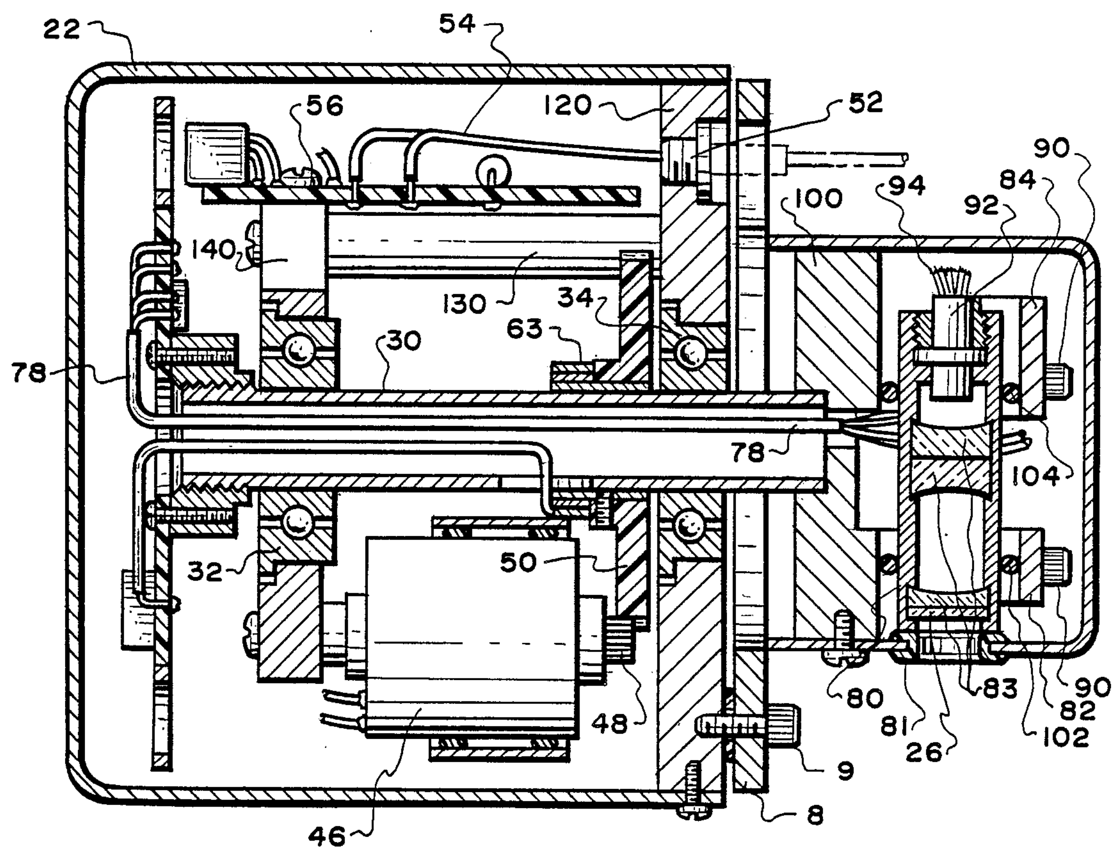
FIG. 5 is an axial cross sectional view of the motorized and the laser compartment of the device taken along the lines 5—5 of FIG. 2.

Referring now to FIG. 3 there is shown the invention apart from the mounting bracket 8 and bracket retaining screws 9. The motor housing 22 is cut away to expose the interior comprising the electronics and mechanics which cause the laser assembly and cover 24 to rapidly spin about the axis of the shaft 30. The shaft 30 is axially placed within the motor housing 22. Two precision ball bearings 32 and 34 keep the shaft in place and allow it to rotate on the bearing surfaces. FIG. 5 clearly shows the two roller bearings 32 and 34 seating the shaft 30. The end of the shaft in the housing has an electronic drive assembly 36 threadably secured to the threaded end of the shaft 30. The electronic drive assembly 36 is a rotating circuit board. Since it is secured to the shaft, it rotates with the shaft 30. The drive assembly 36 has a series of circular holes 40 concentrically positioned around the axis of the shaft 30. The series of holes 40 are aligned with the optical sensor 42 shown in FIGS. 3 and 5. The optical sensor 42 acts as a rotation speed control. It is programmed so that the speed of the shaft is predetermined and the array of spaced circular holes 40 have a stroboscopic effect as the circuit board 36 rotates. The optical sensor 42 senses when the shaft is rotating too rapidly or too slowly and will disable the laser light source automatically.

Figure 6:
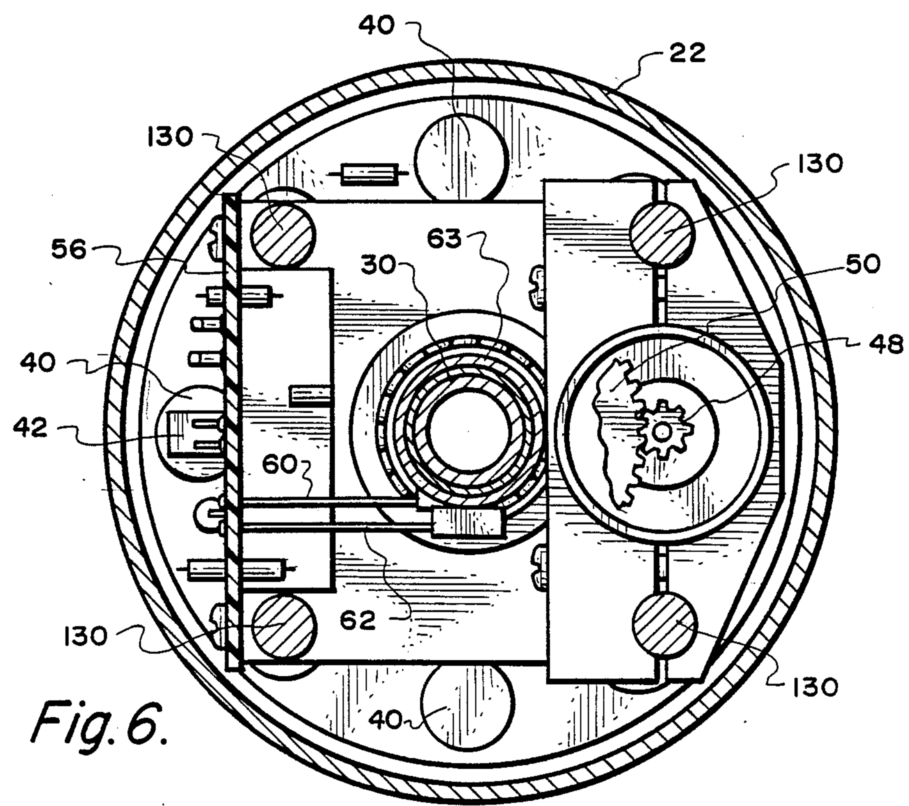
FIG. 6 is a radial cross-sectional view of the motorized compartment of the device taken along the lines 6—6 of FIG. 3. NOTE.

FIGS. 3 and 5 also disclose the electric motor 46 which is the means for rotating the shaft 30 and the supportive equipment which is attached to the shaft 30. The electric motor has a motor drive pinion 48 which meshes with the large main shaft gear 50 as shown in FIG. 6. The power source for energizing the laser beam and the electric motor 46 is originally introduced by an external power source, e.g., a battery pack. The external power source is not considered part of the invention. There is a battery terminal 52 for receiving a plug-in lead and wire and connecting to the external power supply. The electricity flows from the power source and through the wires 54 which connect with the master control circuit board 56. The optical sensor rotation speed control 42 is also attached to the master control circuit board 56. The electricity then flows from the master control circuit board 56 over to the electric motor 46 by lead wires 47 as illustrated in FIG. 3.

Figure 4:
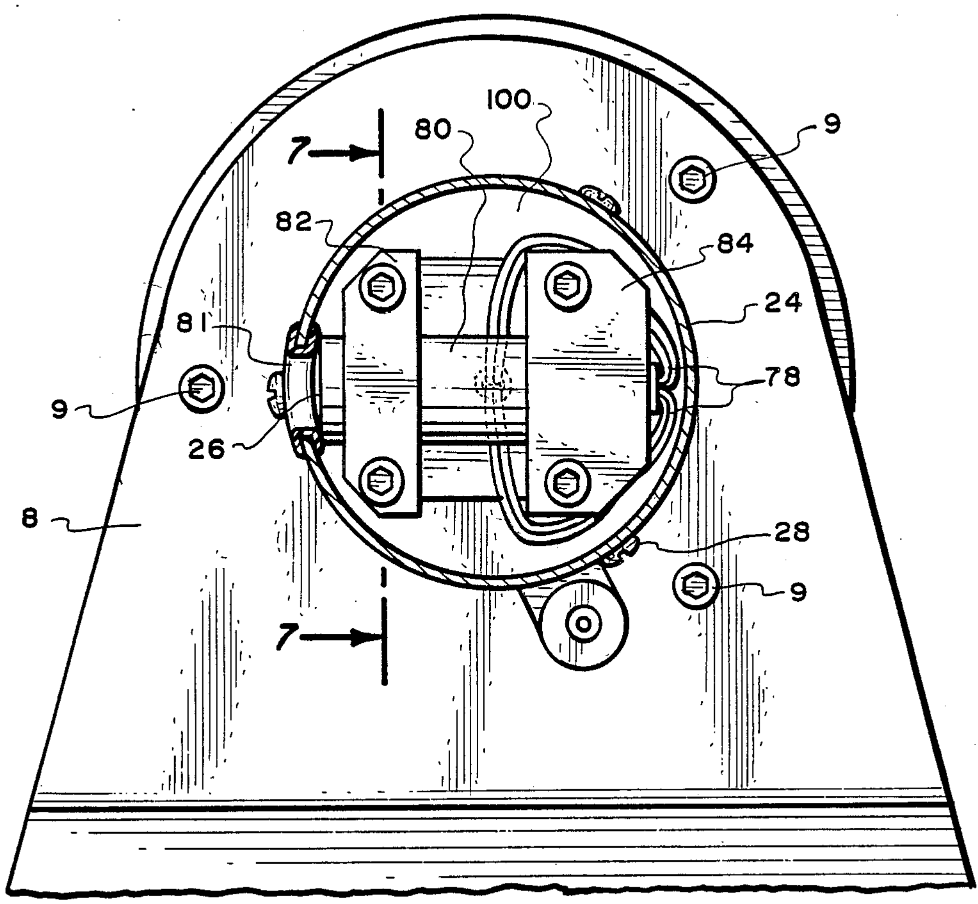
FIG. 4 is a partial cross sectional view illustrating the laser section of the device taken along the lines 4—4 of FIG. 3.

The two brushes 60 and 62 are shown in FIG. 3. These also function as a ground so that electric power flows to the electronic drive assembly 36, also called the logic circuit to drive the laser, has wires 78 going to the laser light source. There is an isolated slip-ring 63 which receives the 6 volt power from the battery pack after the power has been first transferred from the motor control circuit board 56 to the brushes 60 and 62. The ring 63 in turn transfers power to the electronic drive assembly 36. The laser light source is generally labeled as 80 and its cross-section is illustrated in FIG. 5. It's side view is shown in FIG. 4. The laser light source 80 has a lens or eye 26 The lens is sealed by means of a circular grommet 81 placed within the circular hole of the laser housing cover for providing a tight seal between the laser lens 26 and the grommet 81. The laser source 80 or housing is held in place by a first adjustment clamp 82 and a second adjustment clamp 84. Both clamps 82 and 84 have a pair of adjusting screws 90. The laser light source beam exits through the lens 26. The cross section of the laser light source as illustrated in FIG. 5 discloses several lens 83. At the end opposite of the lens is a source for the laser beam itself labeled 92, which is a solid-state laser diode.

In FIG. 5 the electrical wires 94 appear to be cut but as can be seen in FIG. 4, they are the terminals of wires 78 and exit from the source 92 and are fed through the hollow interior of the shaft 30. The leads 78 to the light source 92 terminate at the electronic drive assembly 36. The laser light source is mounted to the face 100 of the shaft 30 which in turn has a series of threaded holes therein for receiving the four adjustment allen-head screws 90. Two O-rings, the first O-ring 102 and the second O-ring 104, are concentrically placed along the axis of the cylindrical laser source 80. The first adjustment clamp 82 and the second adjustment clamp 84 are used to align the laser light source so that it emits a laser beam precisely at 90 degrees relative to the spin axis of the shaft 30. This adjustment is done at the factory after the instrument has been assembled. Realignment in the field is normally not necessary. There is further shown the light source assembly mounting surface 100 for the laser assembly which is clearly disclosed in FIGS. 3 and 5.

The compact laser light source 80 is no more than an inch long. The laser comprises a cylindrically shaped housing. Placed inside is a source 92 for generating a 4 to 5 millimeter circular beam. The power supply is fed to the source of the laser by means of the leads 78 and 94 coming from the electronic drive assembly 36, also known as the rotary circuit board. The laser source 92 is a semiconductor, that is, a solid state laser diode which emits infrared rays. It is not a gas supply and accordingly a couple of thousand volts is not needed to energize this laser source Four to five volts is sufficient to run the laser source. The laser source is found in other applications, e.g., non-impact printers and supermarket scanners. The collimator optics 83 within the laser housing can fine tune the laser beam emitted through the lens 26. In the present invention, the laser housing and assembly must be accurately positioned relative to the axis the unit spins around. As previously stated, there is a motor driven shaft 30 which has an integrated laser circular mounting surface or face 100 to which the laser source is screwed onto. The laser 80 is attached to the face 100 in a radial fashion. The end of the laser, that is the lens end, is placed towards the circumference of the circular face 100. There is a laser assembly cover 24 which fits over and is secured to the shaft face 100 by means of a cover securing screw 28. The laser cover assembly has a circular orifice which matches with the lens 26 of the laser source 80.

The compact collimator light source 80 can be of the type identical to the device currently manufactured by Philip Electronics headquartered in The Netherlands. In a periodical trade publication entitled *Laser Focus* there is an advertisement in the July 1987 issue, volume 23, number 7. The advertisement is placed on page 47. The Philip's laser has a model number 515CQL-A or 515CQL-AH 614-886. This model provides a 2 milliwatt 4 to 5 millimeter circular beam. This semiconductor laser source is one inch long including the collimator optics. The Philip's Compact Collimated Laser Source uses very little power. Since it is a semiconductor laser, only 4 to 5 volts and an equivalent power consumption are all that are required. The laser light source can be driven straight from semiconductor circuitry as previously labeled as the electronic drive assembly 36 and the motor control circuit control circuit board 56.

Figure 7:
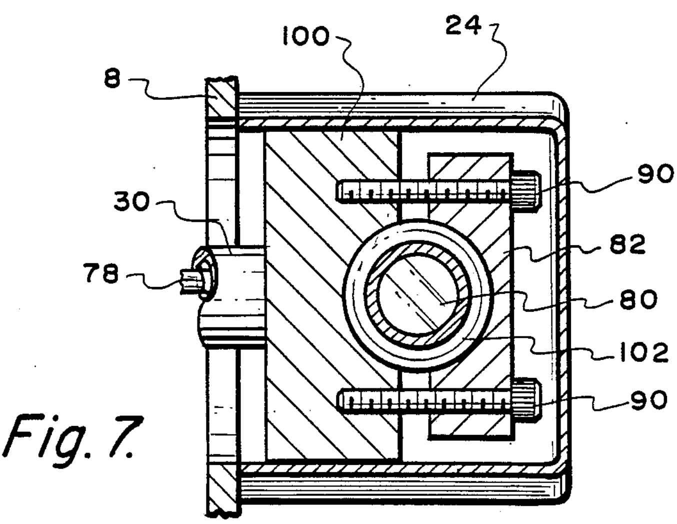
FIG. 7 is a partial cross sectional view of the laser compartment of the device showing the lens of the laser and the means for adjusting the orientation of the laser.

FIG. 7 is a cross sectional view of the first adjustment clamp 82. The shaft assembly face 100 is securely attached to the shaft 30. The first O-ring 102 surrounds the circular housing of the laser light source 80. The pair of adjustment screws 90 attach the first adjustment clamp 82 to the assembly face 100. By means of turning the two adjustment screws 90, the 90 degree orientation of the laser beam relative to the spin axis can be precisely adjusted so that the beam emitted from the laser source is precisely 90 degrees relative to the attached spin axis of the drive shaft.

The entire assembly of the drive shaft 30, the electronic drive assembly 36, the shaft face assembly 100, laser light source 80 and the laser cover 24 all spin as a unit. The drive shaft gear 50 also spins as part of the shaft and the driving force comes from the electric motor 46 and the rotating motor drive pinion 48. The mounting bracket 8 holds the motor housing 22 in place. As can be seen in FIG. 5, the mounting bracket 8 is cut away but it is secured to the assembly mounting surface by means of screws 51. The assembly mounting surface 120 is likewise circular in shape and holds the second precision bearing 34. The assembly mounting surface 120 holds the precision bearing 34. There are four brace rods 130 for holding the assembly mounting surface 120 and the rear brace 140 in position.

What is claimed is:

1. A Rotating Laser Beam Reference Plane Instrument comprising:

compact laser light source which includes a solid state laser diode source and collimating lens all mounted within a compact rapidly rotatable housing unit;

rotatable shaft attached at one end to said compact laser light source, said laser light source being attached precisely perpendicularly to the spin axis of said shaft;

said shaft being relatively short in length;

laser drive circuitry means rotatably mounted to said rotatable shaft and rotatable with said rotatable shaft and said compact laser light source to eliminate destructive noise and intermittence in the laser output;

electric motor means offset from said shaft for rotating said shaft and said laser light source combination and said compact housing unit for generating a reference plane of laser light perpendicular to the spin axis of said shaft;

bearing means with supports for supporting said shaft to precisely hold said rotatable shaft to minimize wobbling of said laser reference plane generated by said rotating laser light source;

nonrotating housing means for containing said shaft and said electric motor means.

2. The instrument as recited in claim 1 further comprising:

motor control circuit board means for controlling said electric motor means.

3. The instrument as recited in claim 2 further comprising:

optical sensor means attached to said motor control circuit board means to monitor and control the rotational speed of said laser drive circuitry means, said shaft, and said compact laser light source assembly, said optical sensor means also being able to disable said laser light source whenever said shaft stops rotating;

brushes and slip rings connecting said motor control circuit board means to said rotating shaft for transferring power to said laser drive circuitry means by way of conducting the power through said shaft to said laser drive circuitry means.

4. The instrument as recited in claim 1 further comprising:

alignment means for aligning the light beam emitted from said laser light source at precisely 90 degrees from the spin axis of said rotating shaft.

5. The instrument as recited in claim 4 wherein said alignment means includes:

a securing face attached at one end of said shaft for securing said laser light source;

at least one adjusting clamp means for supporting a section of said laser light source against said securing face;

at least one O-ring placed around said laser light source and between said adjusting clamp and said securing face for acting as a cushion as said adjusting clamp is moved to align said laser beam.

* * * * *